United States Patent
Singh

(10) Patent No.: US 9,783,171 B2
(45) Date of Patent: Oct. 10, 2017

(54) ELECTROMECHANICAL BRAKING SYSTEMS AND METHODS WITH POWER DEMAND CONTROL

(71) Applicant: Goodrich Corporation, Charlotte, NC (US)

(72) Inventor: Sameep Singh, BeaverCreek, OH (US)

(73) Assignee: Goodrich Corporation, Charlotte, NC (US)

( * ) Notice: Subject to any disclaimer, the term of this patent is extended or adjusted under 35 U.S.C. 154(b) by 122 days.

(21) Appl. No.: 14/791,061

(22) Filed: Jul. 2, 2015

(65) Prior Publication Data

US 2017/0001610 A1    Jan. 5, 2017

(51) Int. Cl.
*B60T 8/17* (2006.01)
*B60T 13/74* (2006.01)
*B64C 25/44* (2006.01)

(52) U.S. Cl.
CPC .............. *B60T 8/17* (2013.01); *B60T 13/741* (2013.01); *B60T 13/746* (2013.01); *B64C 25/44* (2013.01)

(58) Field of Classification Search
CPC ........... B60T 8/17; B60T 13/741; B64C 25/44
See application file for complete search history.

(56) References Cited

U.S. PATENT DOCUMENTS

| 6,000,507 | A * | 12/1999 | Bohm | .................. | B60T 13/741 188/1.11 E |
| 7,523,812 | B2 | 4/2009 | Thibault | | |
| 8,204,661 | B2 | 6/2012 | Godo | | |
| 8,666,625 | B1 | 3/2014 | Georgin | | |
| 8,688,341 | B2 | 4/2014 | Thibault | | |
| 2005/0269872 | A1 | 12/2005 | Ralea | | |
| 2008/0284358 | A1 * | 11/2008 | Ralea | .................. | B60T 8/1703 318/14 |

FOREIGN PATENT DOCUMENTS

| DE | 19536694 | 4/1997 |
| WO | 2007120267 | 10/2007 |

OTHER PUBLICATIONS

Extended European Search Report dated Mar. 20, 2017 in European Application No. 16177720.6.

* cited by examiner

*Primary Examiner* — Jerrah Edwards
*Assistant Examiner* — Kelly D Williams
(74) *Attorney, Agent, or Firm* — Timothy Buckley; Snell & Wilmer L.L.P.

(57) ABSTRACT

A controller for an electromechanical brake actuator (EBA) is provided. EBA has a motor driven in response to a motor drive signal generated by controller. Controller includes a velocity limiter and a current limiter. Velocity limiter limits a velocity command in response to a measured braking force signal output. Limited velocity command has a positive velocity limit boundary defined between a positive maximum velocity limit setpoint and a positive minimum velocity limit setpoint and a negative velocity limit boundary defined between a negative maximum velocity limit setpoint and a negative minimum velocity limit setpoint. Current limiter limits a current command in response to the measured braking force signal output. Limited current command has a positive current limit boundary defined between a positive maximum current limit setpoint and a positive minimum current limit setpoint and a negative current boundary defined between a negative maximum current limit setpoint and a negative minimum current limit setpoint.

17 Claims, 6 Drawing Sheets

ELECTROMECHANICAL BRAKING SYSTEMS AND METHODS WITH POWER DEMAND CONTROL

FIELD

The present disclosure relates generally to electromechanical actuator systems and, more specifically, to electromechanical braking systems and methods with power demand control.

BACKGROUND

Electromechanical brake systems are known in the art, as are other electromechanical actuator systems. These systems draw electric power from a power supply for operation. During peak power draw, the amount of power demanded can be substantial. To meet the peak power demand of electromechanical actuator systems, an appropriately sized power supply and associated conductors should be available. As the peak power demand increases, the size and weight of the power supply and associated components usually increase as well. In environments such as aircrafts, however, there is an ever present desire to reduce the size and weight of on-board items. In addition, on aircraft, the power available is limited.

SUMMARY

A controller for an electromechanical brake actuator (EBA) is provided according to various embodiments. The EBA has a motor that is driven in response to a motor drive signal generated by the controller. The controller includes a velocity limiter and a current limiter. The velocity limiter limits a velocity command to a limited velocity command in response to a measured braking force signal output. The limited velocity command has a positive velocity limit boundary defined between a positive maximum velocity limit setpoint and a positive minimum velocity limit setpoint and a lower velocity limit boundary defined between a negative maximum velocity limit setpoint and a negative minimum velocity limit setpoint. The current limiter limits a current command to a limited current command in response to the measured braking force signal output. The limited current command has a positive current limit boundary defined between a positive maximum current limit setpoint and a positive minimum current limit setpoint and a lower current boundary defined between a negative maximum current limit setpoint and a negative minimum current limit setpoint.

A method is provided for limiting peak power demand of a controller for an electromechanical brake actuator having a motor according to various embodiments. The electromechanical brake actuator is operative to apply a braking force to brake a wheel of a vehicle. The method comprises limiting, by the controller, a velocity command to a limited velocity command and a current command to a limited current command in response to a measured braking force signal output. The limited velocity command has a positive boundary defined between a positive maximum velocity limit setpoint and a positive minimum velocity limit setpoint and a negative boundary defined between a negative maximum velocity limit setpoint and a negative minimum velocity setpoint. The limited current command has a positive current limit boundary defined between a positive maximum current limit setpoint and a positive minimum current limit setpoint and a negative current boundary defined between a negative maximum current limit setpoint and a negative current limit setpoint. The controller outputs a motor drive signal to the motor in accordance with the limited current command.

A system for limiting peak power demand of a controller for an electromechanical brake actuator having a motor is provided according to various embodiments. The motor is driven in response to a motor drive signal generated by a controller. The electromechanical brake actuator is operative to apply a braking force to brake a wheel of a vehicle. The system comprises a force sensor of the electromechanical brake actuator and configured to detect a measured braking force. An output of the force sensor is fed back to the controller as a force feedback signal. A position/velocity sensor of the electromechanical brake actuator and configured to detect a measured velocity. An output of the position/velocity sensor comprises a measured velocity signal output. A current sensor of the electromechanical brake actuator and configured to detect a measured current. An output of the current sensor comprises a measured current signal output. The controller is configured to reduce peak power demand based on the force feedback signal from the force sensor. The controller comprises a velocity limiter for limiting a velocity command to a limited velocity command in response to the measured braking force. The limited velocity command has a positive velocity limit boundary defined between a positive maximum velocity limit setpoint and a positive minimum velocity limit setpoint and a negative velocity limit boundary defined between a negative maximum velocity limit setpoint and a negative minimum velocity limit setpoint. The current limiter limits a current command to a limited current command in response to the measured braking force. The limited current command has a positive current limit boundary defined between a positive maximum current limit setpoint and a positive minimum current limit setpoint and a negative current boundary defined between a negative maximum current limit setpoint and a negative minimum current limit setpoint.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Various embodiments are directed to electromechanical braking systems with power demand control for a vehicle and methods for limiting peak power demand of a controller for an electromechanical brake actuator. In other words, various embodiments reduce the amount of power needed for control of the electromechanical brake actuator. As power is limited on an aircraft, there is a need to limit the power demand. The electromechanical brake actuator is operative to apply a braking force to brake a wheel of a vehicle. The amount of power is reduced by limiting a motor velocity and a motor current based on a measured (braking) force output signal.

Figure 1A:
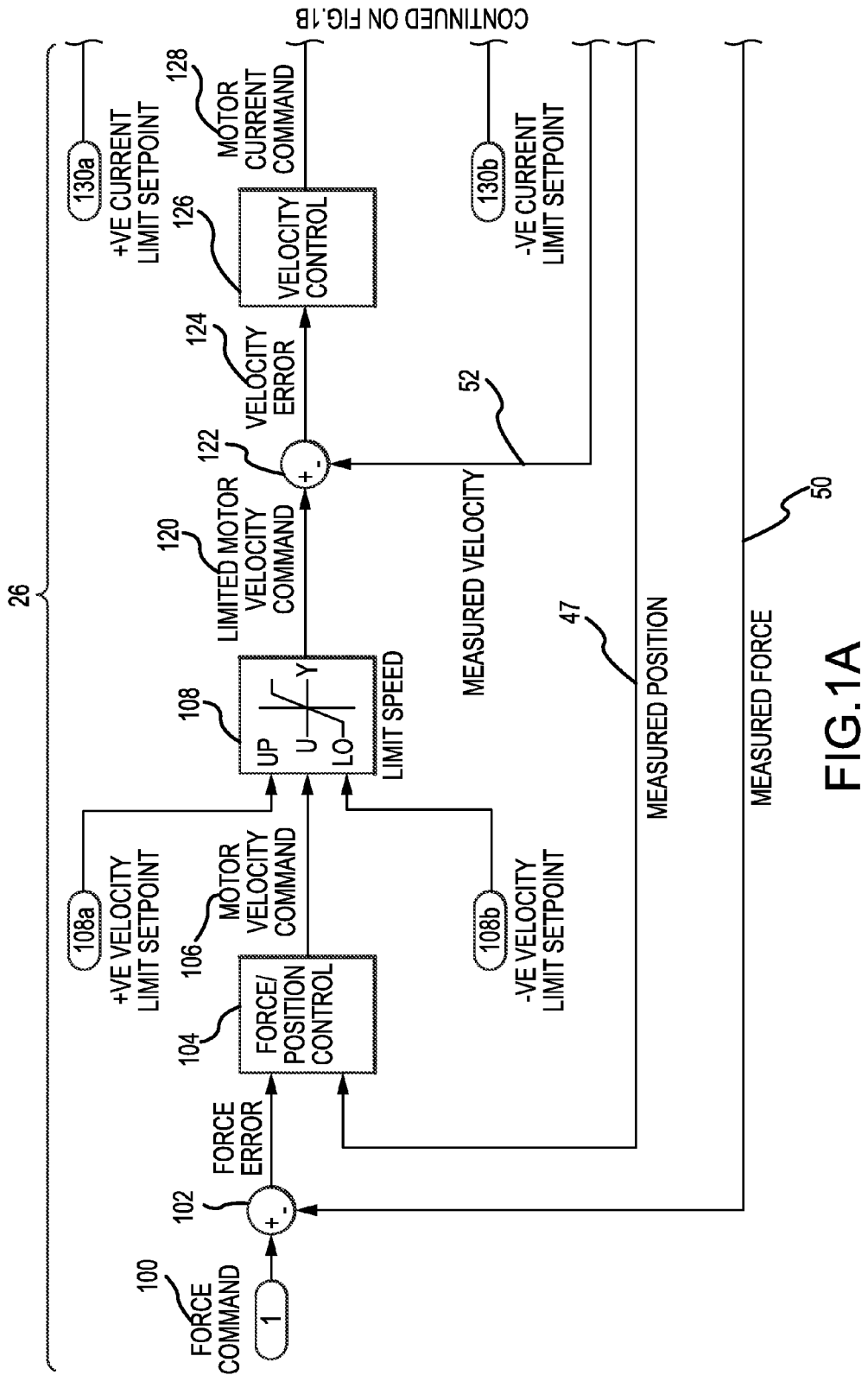
FIGS. 1A and 1B illustrate a functional block diagram of an actuator and controller in accordance with various embodiments.
Figure 1B:
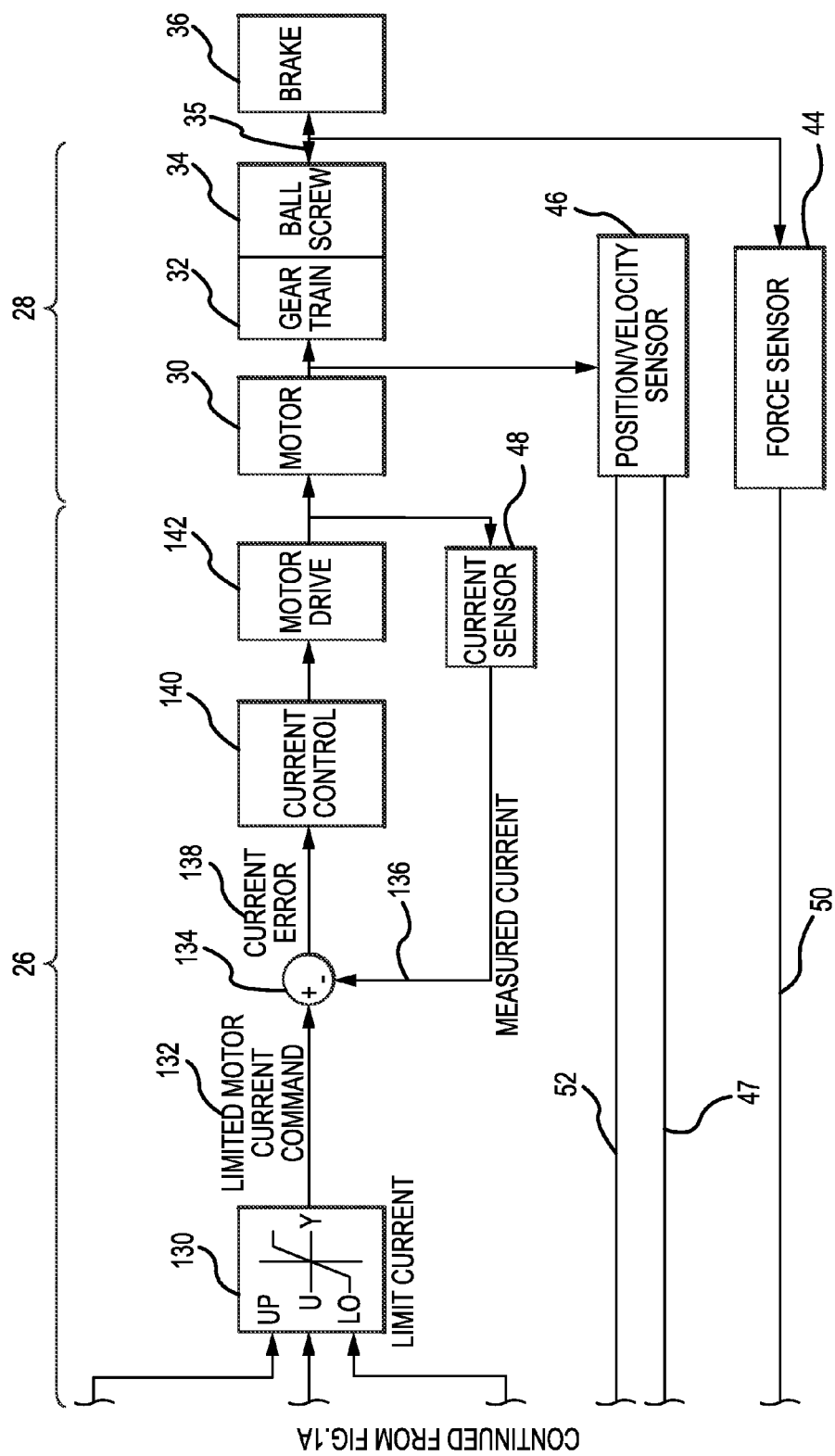

Referring to FIGS. 1A and 1B, according to various embodiments, a functional block diagram of the controller and actuator is shown. FIGS. 1A and 1B (inclusive of FIG. 2) also represent a control system and method. The control method uses braking force to limit peak power demand on the power supply. The control functions of the controller may be embodied as executable logic that is executed by a processor of the controller. Dedicated circuitry may be used to carry out the control functions described herein.

The controller 26 uses a nested loop feedback arrangement as illustrated to generate a motor drive signal from an input braking command (i.e., a force command 100). As hereinafter described in more detail, the nested loop feedback arrangement generally comprises a current control loop, a velocity control loop, a position control loop, and a force control loop. The current control receives a current command from the velocity control. The motor current is directly proportional to torque (and, thus, braking force). The velocity control loop encloses the current loop of the control system. Velocity commands are received from the position control loop and the force control loop. The velocity control loop controls the speed at which the actuator moves toward the brake to satisfy slew rate control and reduction of peak power draw requirements. The position control loop encloses the velocity loop of the control system and enables control of the electromechanical actuator position. The force control loop provides independent force control for each electromechanical actuator in the electromechanical braking system.

Still referring to FIGS. 1A and 1B, according to various embodiments, an electromechanical brake actuator 28 generally includes a motor 30 and gear train 32 that drives an actuator ram (also referred to as a force applicator) 35 in an axial direction toward and away from a brake stack 36 (referred to simply in FIGS. 1A and 1B as "brake"). More specifically, the motor 30 drives the gear train 32, which in turn drives a ballscrew assembly 34. The ballscrew assembly 34 drives the actuator ram 35 back and forth in an axial direction so as to exert a braking force on the brake stack 36. In order to exert the braking force, the motor and gear train 32 is controlled by a controller 26 causing the actuator ram to extend toward the brake stack. In this manner, a clamp or braking force is exerted on the brake stack. In order to release a braking force, the controller 26 controls the motor and gear train 32 to drive the actuator ram 35 in the reverse direction away from the brake stack 36 (i.e., to retract). In the event no braking command is present, it is desirable to provide a running clearance (also referred to herein as "free space") between the brake engagement surface of the actuator ram 35 and the brake stack 36. Accordingly, the controller 26 controls the motor 30 and gear train 32 to provide the desired running clearance when braking is not commanded.

While only a single actuator 28 is shown for applying a braking force to the brake stack 36, it is to be understood that a control system may include multiple, identically operated actuators 28 each on a wheel for exerting braking force on the brake stack 36. Each actuator 28 may have its own force sensor 44, position/velocity sensor 46, and current sensor 48 as hereinafter described that provide feedback signals to the appropriate controller(s) 26.

Still referring to FIGS. 1A and 1B, according to various embodiments, the controller 26 receives an input in the form of an input signal, such as a force or braking command signal. The value of the force command signal is typically proportionally based on the degree to which the pilot has depressed a corresponding brake pedal. In addition, or in the alternative, the force command signal may be based on the results of an antiskid control algorithm carried out by the controller 26 or elsewhere within an aircraft. In the event of light braking, the force command signal may have a low value that causes the controller 26 to drive the motor 30 and gear train 32 such that the actuator ram exerts a light braking force (i.e., a low braking force such as when the pilot has lightly depressed the corresponding brake pedal on the brake). Similarly, in the event of heavy braking (i.e., high braking force such as when the pilot has heavily depressed the corresponding brake pedal), the force command signal may have a high value that causes the controller 26 to drive the motor 30 and gear train 32 such that the actuator ram exerts a heavy braking force on the brake stack 36. The actuator 28 includes a force sensor 44 that detects the braking force exerted by the actuator ram onto the brake stack 36. The output of the force sensor 44 is fed back as a force feedback signal 50 and is input to the controller 26 (more specifically a first adder 102 thereof) for performing force based control functions over the actuator 28. The force sensor 44 may be any type of known force sensor including, but not limited to, a force load cell or the like. According to various embodiments as hereinafter described, the speed of rotation of the actuator motor (i.e., the velocity) is limited based on a measured force as reflected in the force feedback signal 50. The force feedback signal may also be referred to herein as a measured braking force output signal 50.

Still referring to FIGS. 1A and 1B, according to various embodiments, the actuator 28 further includes a position/velocity sensor 46. In various embodiments, the position/velocity sensor 46 is embodied as a resolver that senses the position of the rotor of the motor in the motor and gear train 32. Based on the output of the resolver, the controller 26 is able to detect the direction, number of revolutions of the rotor per unit time and the angular velocity of the rotor (e.g., in revolutions per minute) per unit time. As the ratio of the gear train of the motor 30 and gear train 32 in combination with the actuator ram is known, the controller 26 is able to compute the relative position of the actuator ram and motor velocity based on the output of the resolver. Stated another way, the output of the resolver provides relative feedback data that can be converted to a position value of the ram 34 and/or an angular velocity value of the motor. That is, in embodiments where the position/velocity sensor 46 is a resolver, rotor position and rotor velocity can be interchanged by tracking resolver output with a position counter and timer (e.g., position accumulator) and making a comparison against a reference location for the actuator ram. Therefore, speed (i.e., angular velocity) may be determined from position and/or there may be a separate speed (velocity) sensor. In various embodiments, the position/velocity sensor 46 can be embodied as separate sensors, one for providing absolute or relative position feedback 47 to the controller 26 and the other for providing motor velocity feedback 52 to the controller 26. In any implementation, position feedback information assists the controller 26 in performing position based control functions of the actuator 28 and velocity feedback information assists the controller 26 in performing velocity based control functions of the actuator 28. The motor 30 may be a brushless DC motor. Consequently, the controller 26 also utilizes the output of the resolver to determine the appropriate phasing of the power signals provided to the motor 30 via a motor drive signal (as hereinafter described) to provide a desired motor commutation. In this manner, there is no need for separate position sensors for the DC motor and the actuator ram, respectively.

As noted above, the controller 26 receives an input in the form of an input signal, such as a force or braking command signal 100. The first adder 102 compares the force command 100 and the measured force signal output 50 from the force sensor 44. The difference signal (i.e., the force error) from the first adder 102 is input to a force/position control block 104 that acts on the difference signal to generate a velocity command 106. The velocity command is input to a velocity limiter 108 (FIGS. 1A and 2) that limits the commanded velocity to a value ranging from a positive maximum velocity limit setpoint (W2) to a negative maximum velocity limit setpoint (W4). The output of the velocity limiter is a limited velocity command 120. An algorithm as known to one skilled in the art indicates that in order to achieve the specific measured force signal output 50 in a certain time duration, the motor should spin at a certain speed (i.e., a certain angular velocity). The velocity command 106 commands the motor to spin at the certain speed. The limited velocity command 120 addresses the maximum and minimum limits that the motor can spin.

Figure 2:
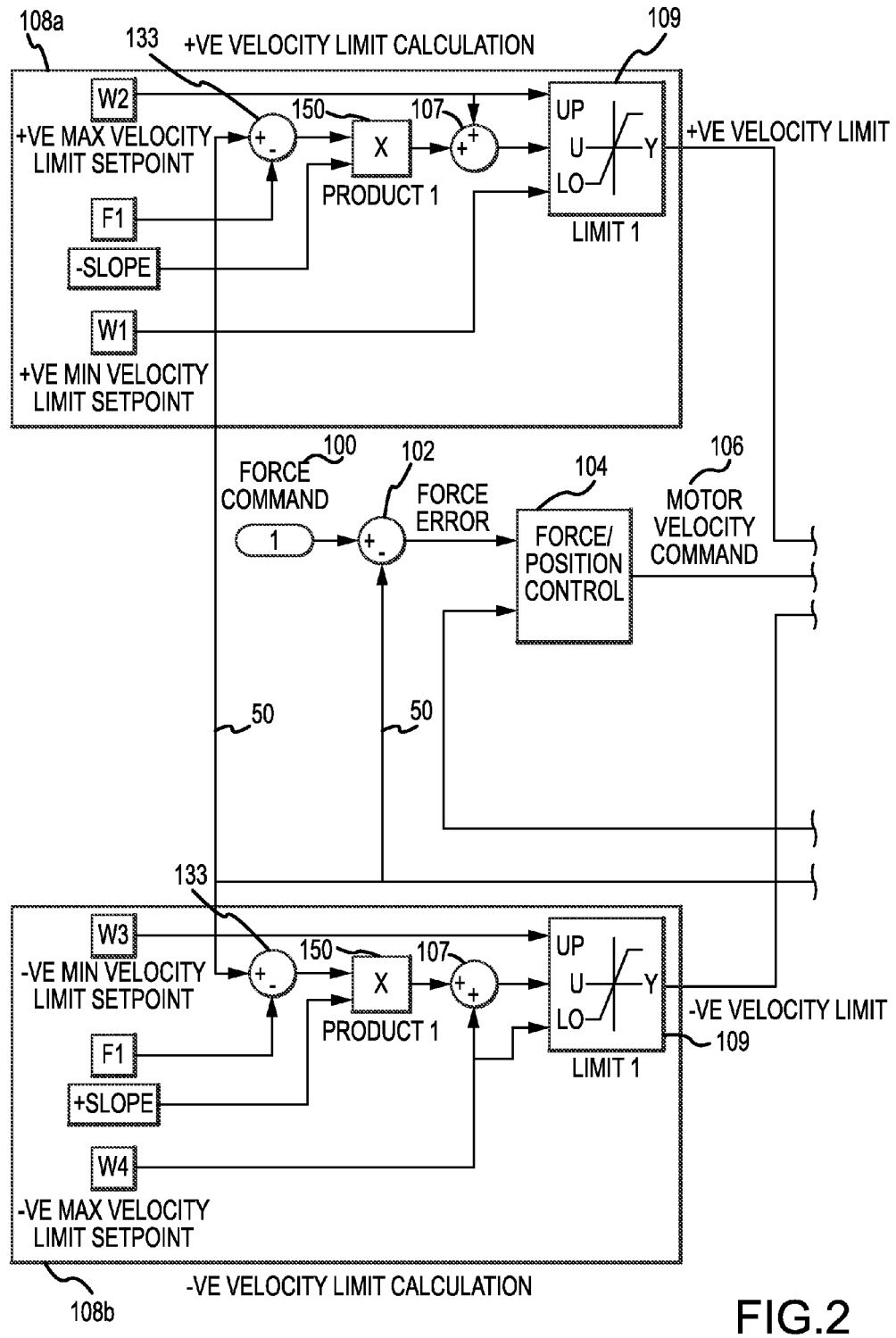
FIG. 2 illustrates a portion of the functional block diagram of FIG. 1A with a positive maximum and minimum velocity limit generation branch (a positive velocity saturation circuit) and a negative maximum and minimum velocity limit generation branch (a negative velocity saturation circuit) in accordance with various embodiments.

Still referring to FIGS. 1A and 1B, and now specifically to FIG. 2, according to various embodiments, generation of the limited velocity command is illustrated. The portion of the block diagram of FIG. 1A includes the velocity limiter 108 used to generate positive and negative maximum and minimum velocity limits for the motor. The velocity limiter 108 includes a positive velocity limit generation branch 108a and a negative velocity limit generation branch 108b as depicted more specifically in FIG. 2. In various embodiments, when the motor spins in a positive, clockwise direction, the actuator ram may advance the actuator ram into the brake stack. When the motor spins in a negative, counterclockwise direction, the actuator moves the actuator ram away from the brake stack. In various embodiments, when the motor spins in the positive, clockwise direction, the actuator moves the actuator ram away from the brake stack. When the motor spins in a negative, counterclockwise direction, the actuator ram may advance the actuator ram into the brake stack. As noted previously, the velocity command is based on a measured braking force signal output (50 in FIGS. 1A, 1B, and 2). The positive velocity limit generation branch 108a may receive a positive maximum velocity limit setpoint (W2) and a positive minimum velocity limit setpoint (W1). The negative velocity limit generation branch 108b receives a negative maximum velocity limit setpoint (W3) and a negative minimum velocity setpoint (W4). W1 and W2 define a positive velocity limit boundary between the positive maximum and minimum velocity limit setpoints. W3 and W4 define a negative velocity limit boundary between the negative maximum and minimum velocity limit setpoints. Different velocity limit setpoint values may be tried in order to bring the peak power demand below the requirements limit. In other words, W1 and W2 define respectively the maximum and minimum speed commands at which the motor can spin in the positive, clockwise direction and W3 and W4 define respectively the maximum and minimum speed commands at which the motor can spin in the negative, counterclockwise direction. These positive and negative boundaries set a limit for the velocity command, resulting in the limited velocity command that controls the speed at which the actuator moves to satisfy slew rate. In each of the velocity limit generation branches 108a and 108b, the measured force signal output 50 (FIGS. 1A and 2) from the force sensor 44 (FIG. 1B) is compared with the tunable force setpoint F1 (FIG. 2) by adder 133. The difference in signal output from velocity adder 133 is subjected to a multiplication factor (−slope for 108a and +slope for 108b (FIGS. 2 and 3)). The slope is calculated (using the known mathematical equation for determining slope) using the tunable setpoints on the x-axis (F1 and F2) and the y-axis (W1, W2, W3, and W4) shown in FIG. 3 to reduce the peak power demand. For the positive velocity limit generation branch, the product 150 is output to a velocity saturation adder 107 that adds the product 150 and the positive maximum velocity limit setpoint (W2). For the negative velocity limit generation branch, the product 150 is output to a velocity saturation adder 107 that adds the product 150 and the negative maximum velocity limit setpoint (W4). The output (the sum of product 150 and the positive maximum velocity limit setpoint) of velocity saturation adder 107 is bounded between the positive maximum velocity limit setpoint and the positive minimum velocity limit setpoint for the positive boundary velocity and between the negative maximum velocity limit and the negative minimum velocity limit for the negative boundary velocity using a velocity limit block 109. As noted above, the output of the velocity limiter is a limited velocity command 120.

Figure 3:
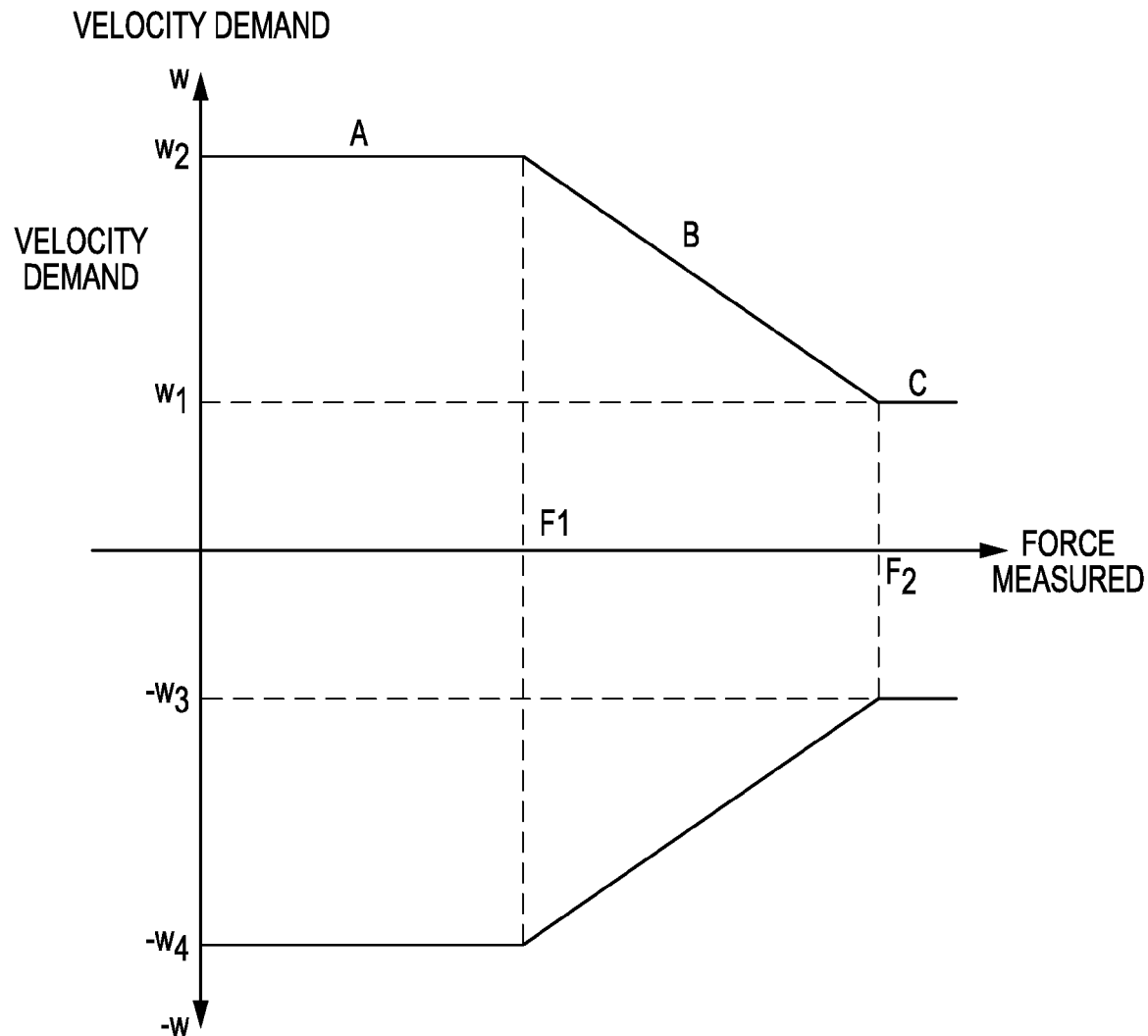
FIG. 3 is a graph plotting the measured force (x-axis) against velocity demand (y-axis) on the actuator motor in accordance with various embodiments.

FIG. 3 is a graph plotting the operating range of the electric motor of one of the actuators in the velocity/force plane, the operating range including a boundary defining a first straight line A, corresponding to a stage during which the ram is approaching the disks at maximum positive velocity. As the actuator ram is applying a braking force against the disks above F1, the velocity command limit output changes according to the line B until the braking force reaches F2, when the velocity command is defined by the line C. There is no braking force until the ram is against the brake. FIG. 3 illustrates that as braking force increases above F1, a lower velocity command is output from F1 to F2, after which the velocity command limit does not change anymore.

Referring again to FIG. 1A, a second adder 122 compares the limited velocity command 120 and the measured velocity signal output 52 from the position/velocity sensor 46 (FIG. 1B). A difference signal (i.e., a "velocity error") 124 from the second adder 122 is sent to a velocity control compensator block 126 that acts on the difference signal from the second adder 122 to generate a motor current command 128.

Figure 4:
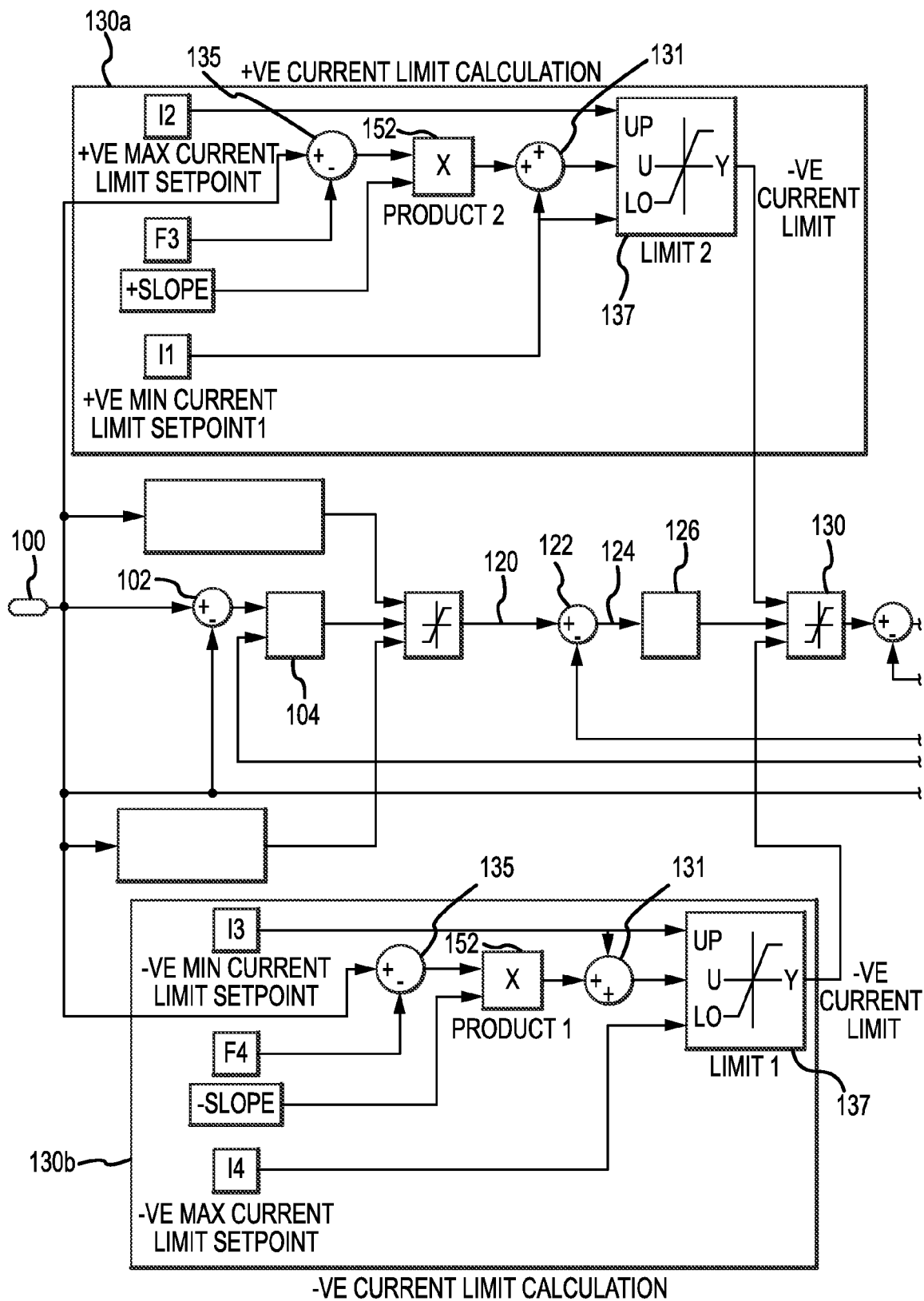
FIG. 4 illustrates a portion of the functional block diagram of FIGS. 1A and 1B with a positive maximum and minimum current limit generation branch (a positive current saturation circuit) and a negative maximum and minimum current limit generation branch (a negative current saturation circuit) in accordance with various embodiments.
Figure 5:
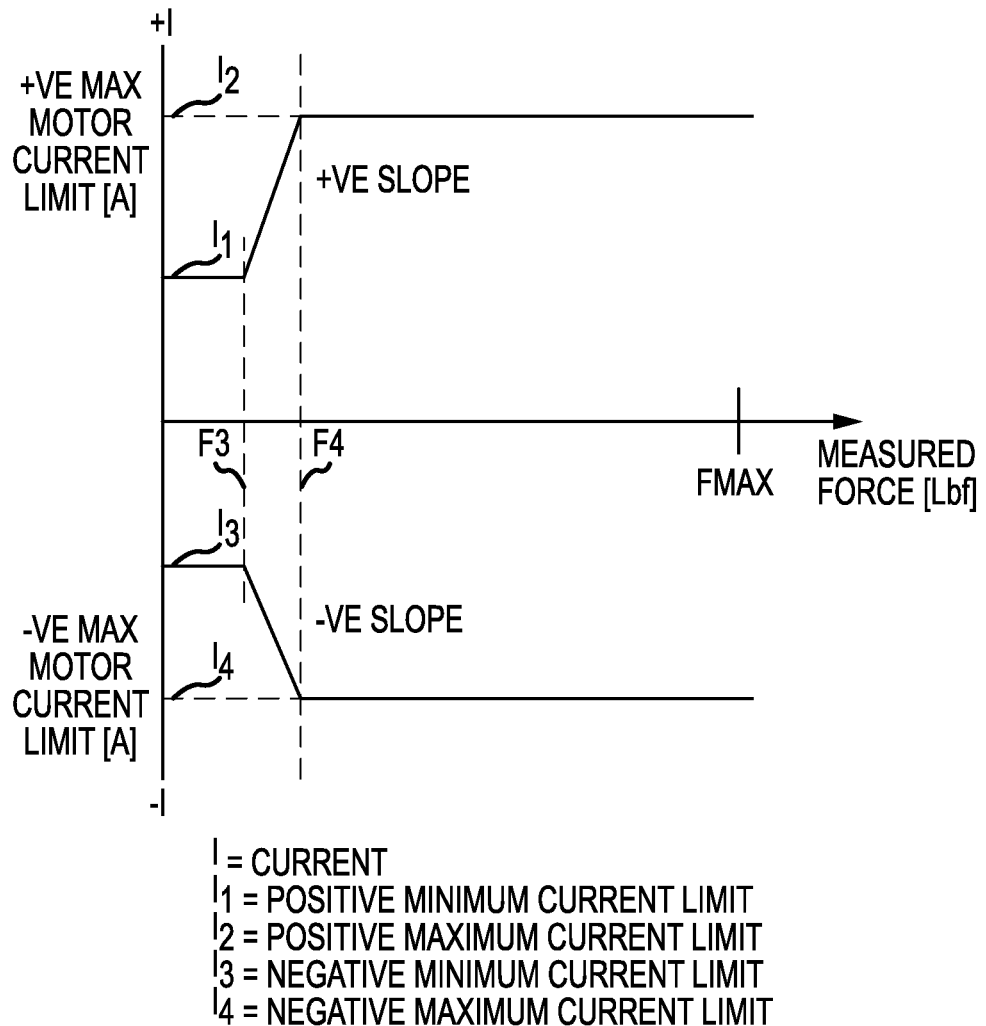
FIG. 5 is a graph plotting the measured force (x-axis) against current demand (y-axis) on the actuator motor in accordance with various embodiments.

Continuing on to FIG. 1B and now referring to FIG. 4, the current command 128 is input to a current limiter 130. The output of the current limiter 130 is a limited current command 132. The current limiter 130 is used to generate positive and negative maximum and minimum current limits for the motor. The current limiter 130 includes a positive current limit generation branch 130a and a negative current limit generation branch 130b as depicted more specifically in FIG. 4. The positive and negative current limit calculation is based on the measured braking force. The positive current limit generation branch 130a may receive a positive maximum current limit setpoint (I2) and a positive minimum current limit setpoint (I1). The negative current limit generation branch 130b may receive a negative maximum current limit setpoint (I3) and a negative minimum current setpoint (I4). Different current limit setpoint values may be tried in order to bring the peak power demand below the requirements limit. I1 and I2 define a positive current limit boundary between the positive maximum and minimum current limits. I3 and I4 define a negative current limit boundary between the negative maximum and minimum current limits. In each of the current limit generation branches 130a and 130b, the measured braking force (more particularly, the force feedback signal) is compared to the force setpoint F3 (FIGS. 4 and 5). The difference from adder 135 is subjected to a multiplication factor (+slope for 130a and −slope for 130b (FIGS. 4 and 5)). Slope is calculated using the tunable setpoints on the x-axis (F3 and F4) and the y-axis (I1, I2, I3, and I4) shown in FIG. 5 to reduce the peak power demand. The product 152 is output to a current saturation adder 131 that adds the product 152 with the positive minimum current limit setpoint (I1). The product 152 is output to a current saturation adder 131 that adds the product 152 with the negative minimum current limit setpoint (I3). The output of current saturation adder 131 is bounded between the positive maximum current and the positive minimum current limit for the positive boundary current and between the negative maximum current and the negative minimum current for the negative boundary current using a current limit block 137. As noted above, the output of the current limiter 130 is the limited current command 132. The current limiter 130 uses the measured braking force and limits the current command to a value I1 if the measured braking force is less than F3 and increases in value as the measured braking force increases from F3 to F4 (FIG. 5). F3 has a low value relative to F4.

The current command is limited to a value less than or equal to I1 when the actuator ram is not touching the brake (i.e., when the actuator ram is in free space), or when the measured force is below a specified threshold value F3. In various embodiments, the current command may be a negative value representing the commanding of a retraction of the actuator ram, a positive value representing the commanding of an advancement of or force application with the actuator ram, and zero representing no movement of the actuator ram. In various embodiments, the negative value may represent the commanding of the advancement of or force application with the actuator ram and the positive value representing the commanding of the retraction of the actuator ram. The motor current is directly proportional to torque (i.e., braking force). The current and velocity limits are varied to meet the recommended peak power demand. The velocity and current control loops use variable slew rates based on the measured force. FIG. 5 illustrates that as the braking force increases, a higher current command is output in order for the motor to be able to apply the required braking force or torque.

Returning now to FIG. 1B, according to various embodiments, a third adder 134 compares the limited current command 132 and the measured current signal output 136 from the current sensor 48. The difference signal (i.e., the "current error" 138) from the third adder 134 is input to a current control compensator block 140 that acts on the difference signal 138 from the third adder 134 to generate a voltage signal that is fed to the motor drive 142 to spin the motor 30. The voltage signal comprises the motor drive signal. As noted previously, the motor 30 drives the gear train 32, which in turn drives the ballscrew assembly 34. The ballscrew assembly 34 drives the actuator ram 35 back and forth in an axial direction so as to exert a braking force on the brake stack 36. Reaction of the ballscrew assembly, which corresponds to load reaction force of the actuator ram, is sensed through the force sensor. The output of the force sensor is indicative of the braking force applied by the actuator ram to the brake. When the braking force is applied by the actuator ram to the brake, the slew rate is changed based on the braking force. When the actuator ram is off the brake (i.e., the force command may be substantially zero (i.e., within 5% of zero)), the current limiter limits the current as previously described. When the actuator ram is off the brake, there is a no load slew rate as there is no load being applied.

Operational electrical power for motor drive signal generation by the motor drive 142 can be derived from a power supply. The power supply can be any suitable power source available from the aircraft. For instance, the power supply can be DC or AC power busses (connected to the controller directly or via a voltage converter), a battery, an independent power generator or combination of sources where one source supplements for another if the first were to fail to supply power.

Thus, as illustrated in the block diagram of FIGS. 1A and 1B, the controller 26 uses a closed loop feedback arrangement to generate the motor drive signal in accordance with the input braking command (i.e., the force command). For example, the controller 26 can use velocity compensation and current compensation to convert the input braking command (i.e., the force command) into a limited current command. As a result, as the braking force increases, the amount of current drawn on the aircraft DC bus will increase. Reducing the maximum velocity dynamically with an increase in measured force reduces the peak current, i.e., peak power drawn from the DC bus. Reducing the acceleration (i.e., the slew rate) lowers the current. When the measured force is increasing, the speed is reduced, also indirectly lowering the bus current.

Limiting the current delivered to the motor in this manner advantageously reduces the peak power demand of the controller and actuator. Therefore, the power supply may be smaller and lighter than a power supply sized to meet the peak power demands without current limits. More power is available for aircraft functions other than meeting the peak power demands of the electromechanical actuator systems such as electromechanical brake systems. It is important to ensure that the actuators cannot draw power greater than the maximum authorized power.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A controller for an electromechanical brake actuator having a motor that is driven in response to a motor drive signal generated by the controller comprising:

a velocity limiter that limits a velocity command to a limited velocity command in response to a measured braking force signal output, the limited velocity command having a positive velocity limit boundary defined between a positive maximum velocity limit setpoint and a positive minimum velocity limit setpoint and a negative velocity limit boundary defined between a negative maximum velocity limit setpoint and a negative minimum velocity limit setpoint;

a current limiter that limits a current command to a limited current command in response to the measured braking force signal output, the limited current command having a positive current limit boundary defined between a positive maximum current limit setpoint and a positive minimum current limit setpoint and a negative current boundary defined between a negative maximum current limit setpoint and a negative minimum current limit setpoint, wherein the limited velocity command and the limited current command are based on the measured braking force signal output as detected by a force sensor and an output of the force sensor is fed back to the controller as a force feedback signal, and wherein the velocity limiter includes a velocity adder for outputting a difference in the force feedback signal and a force setpoint F1.

2. The controller of claim 1, wherein a first adder of the controller compares a force command and the force feedback signal from the force sensor to generate a force error that is input to a force/position control block that acts on the force error to generate the velocity command.

3. The controller of claim 1, wherein the limited velocity command controls a slew rate comprising electromechanical brake actuator acceleration.

4. The controller of claim 1, wherein the difference is multiplied by a multiplication factor and a product thereof added with a velocity limit setpoint in a velocity saturation adder with the sum thereof bounded between the positive maximum velocity limit setpoint and the positive minimum velocity limit setpoint and between the negative maximum velocity limit setpoint and the negative maximum velocity limit setpoint and the current limiter includes a current limiter for outputting a difference in the force feedback signal and a force setpoint F3, the difference is multiplied by a multiplication factor and a product thereof added with a current limit setpoint in a current saturation adder with the sum thereof bounded between the positive maximum current limit setpoint and the positive minimum current limit setpoint and between the negative maximum current limit setpoint and the negative maximum current limit setpoint.

5. The controller of claim 2, wherein a second adder of the controller compares the limited velocity command and a measured velocity signal output from a position/velocity sensor to generate a velocity error that is input to a velocity control compensator block that acts on the velocity error to generate the current command.

6. The controller of claim 5, wherein a third adder compares the limited current command and a measured current signal output from a current sensor to generate a current error that is input to a current control compensator block that acts on the current error to generate a voltage signal comprising the motor drive signal.

7. The controller of claim 1, wherein the electromechanical brake actuator controls movement of an actuator ram moving toward a brake stack or away from a brake stack, the velocity command and the current command depending upon whether the actuator ram is in free space or on the brake stack.

8. A method for limiting peak power demand of a controller for an electromechanical brake actuator having a motor, the electromechanical brake actuator operative to apply a braking force to brake a wheel of a vehicle, the method comprising:
  limiting, by the controller, a velocity command to a limited velocity command in response to a measured braking force signal output, the limited velocity command having a positive velocity limit boundary defined between a positive maximum velocity limit setpoint and a positive minimum velocity limit setpoint and a negative velocity limit boundary defined between a negative maximum velocity limit setpoint and a negative minimum velocity setpoint;
  limiting, by the controller, a current command to a limited current command in response to the measured braking force signal output, the limited current command having a positive current limit boundary defined between a positive maximum current limit setpoint and a positive minimum current limit setpoint and a negative current limit boundary defined between a negative maximum current limit setpoint and a negative minimum current limit setpoint;
  outputting, by the controller, a motor drive signal to the motor in accordance with the limited current command, wherein limiting the velocity command and the current command depends on the measured braking force signal output as detected by a force sensor and an output of the force sensor is fed back to the controller as a force feedback signal; and
  generating the velocity command prior to limiting the velocity command, wherein generating the velocity command comprises using a first adder of the controller to compare a force command and the force feedback signal from the force sensor to generate a force error that is input to a force/position control block that acts on the force error to generate the velocity command, wherein limiting the velocity command comprises using a velocity adder for outputting a difference in the force feedback signal and a force setpoint F1.

9. The method of claim 8, wherein the electromechanical brake actuator controls movement of an actuator ram moving toward a brake stack or away from the brake stack, wherein limiting the velocity command and the current command depends upon whether the actuator ram is in free space or on the brake stack.

10. The method of claim 8, wherein the difference is multiplied by a multiplication factor and a product thereof added with a velocity limit setpoint in a velocity saturation adder with the sum thereof bounded between the positive maximum velocity limit setpoint and the positive minimum velocity limit setpoint and between the negative maximum velocity limit setpoint and the negative maximum velocity limit setpoint.

11. The method of claim 8, wherein limiting the current command comprises using a current adder for outputting a difference in the force feedback signal and a force setpoint F3, the difference multiplied by a multiplication factor and a product thereof added with a current limit setpoint in a current saturation adder with the sum thereof bounded between the positive maximum current limit setpoint and the positive minimum current limit setpoint and between the negative maximum current limit setpoint and the negative maximum current limit setpoint.

12. The method of claim 8, further comprising generating the current command prior to limiting the current command, wherein generating the current command comprises using a second adder to compare the limited velocity command and a measured velocity signal output from a position/velocity sensor to generate a velocity error that is input to a velocity control compensator block that acts on the velocity error to generate the current command, the method further comprising generating a voltage signal comprising the motor drive signal, wherein a third adder compares the limited current command and a measured current signal output from a current sensor to generate a current error that is input to a current control compensator block that acts on the current error to generate the voltage signal.

13. A system for limiting peak power demand of a controller for an electromechanical brake actuator having a motor that is driven in response to a motor drive signal generated by the controller, the electromechanical brake actuator operative to apply a braking force to brake a wheel of a vehicle, the system comprising:
  a force sensor of the electromechanical brake actuator and configured to detect a measured braking force, wherein an output of the force sensor is fed back to the controller as a force feedback signal;
  a position/velocity sensor of the electromechanical brake actuator and configured to detect a measured velocity, an output of the position/velocity sensor comprising a measured velocity signal output;
  a current sensor of the electromechanical brake actuator and configured to detect a measured current, an output of the current sensor comprising a measured current signal output;
  the controller configured to reduce peak power demand based on the force feedback signal from the force sensor, the controller comprising:
  a velocity limiter for limiting a velocity command to a limited velocity command in response to the measured braking force, the limited velocity command having a positive velocity limit boundary defined between a positive maximum velocity limit setpoint and a positive minimum velocity limit setpoint and a negative velocity limit boundary defined between a negative maximum velocity limit setpoint and a negative minimum velocity limit setpoint; and
  a current limiter for limiting a current command to a limited current command in response to the measured braking force signal output, the limited current command having a positive current limit boundary defined between a position maximum current limit setpoint and a positive minimum current limit setpoint and a negative current boundary defined between a negative maximum current limit setpoint and a negative minimum current limit setpoint, wherein the velocity limiter includes a velocity adder for outputting a difference in the force feedback signal and a force setpoint F1.

14. The system of claim 13, wherein a first adder of the controller compares a force command and the force feedback signal from the force sensor to generate a force error that is input to a force/position control block that acts on the force error to generate the velocity command.

15. The system of claim 13, wherein the difference is multiplied by a multiplication factor and a product thereof added with a velocity limit setpoint in a velocity saturation adder with the sum thereof bounded between the positive maximum velocity limit setpoint and the positive minimum velocity limit setpoint and between the negative maximum velocity limit setpoint and the negative maximum velocity limit setpoint and the current limiter includes a current limiter for outputting a difference in a force feedback signal and a force setpoint F3, the difference is multiplied by a multiplication factor and a product thereof added with a current limit setpoint in a current saturation adder with the sum thereof bounded between the positive maximum current limit setpoint and the positive minimum current limit setpoint and between the negative maximum current limit setpoint and the negative maximum current limit setpoint.

16. The system of claim 14, wherein the controller includes a second adder that compares the limited velocity command and a measured velocity signal output to generate a velocity error that is input to a velocity control compensator block that acts on the velocity error to generate the current command.

17. The system of claim 16, wherein the controller includes a third adder that compares the limited current command and a measured current signal output from the current sensor to generate a current error that is input to a current control compensator block that acts on the current error to generate a voltage signal comprising the motor drive signal.

* * * * *